United States Patent
Mashburn et al.

(10) Patent No.: US 9,011,740 B2
(45) Date of Patent: Apr. 21, 2015

(54) METHOD OF RECYCLING SYNTHETIC TURF AND INFILL PRODUCT

(75) Inventors: Larry Mashburn, Ringgold, GA (US); William Henry Harrison, IV, Dalton, GA (US); Dewayne Ray Miller, Dalton, GA (US)

(73) Assignee: Textile Management Associates, Inc., Dalton, GA (US)

( * ) Notice: Subject to any disclaimer, the term of this patent is extended or adjusted under 35 U.S.C. 154(b) by 846 days.

(21) Appl. No.: 12/638,656

(22) Filed: Dec. 15, 2009

(65) Prior Publication Data

US 2010/0151158 A1 Jun. 17, 2010

Related U.S. Application Data

(60) Provisional application No. 61/122,592, filed on Dec. 15, 2008.

(51) Int. Cl.

| | | |
|---|---|---|
| *B29C 67/02* | (2006.01) | |
| *B29C 73/00* | (2006.01) | |
| *B29B 17/02* | (2006.01) | |
| *B29B 17/04* | (2006.01) | |
| *C08J 11/06* | (2006.01) | |
| *E01C 13/08* | (2006.01) | |
| *B29K 67/00* | (2006.01) | |
| *B29K 75/00* | (2006.01) | |
| *B29L 31/00* | (2006.01) | |

(52) U.S. Cl.
CPC ......... *B29B 17/0206* (2013.01); *B29K 2023/06* (2013.01); *B29K 2067/00* (2013.01); *B29K 2075/00* (2013.01); *C08J 11/06* (2013.01); *E01C 13/08* (2013.01); *B29L 2031/732* (2013.01); *Y10S 264/911* (2013.01); *Y10S 264/913* (2013.01); *Y10S 264/92* (2013.01)

(58) Field of Classification Search
None
See application file for complete search history.

(56) References Cited

U.S. PATENT DOCUMENTS

| | | |
|---|---|---|
| 3,596,576 A | 8/1971 | Cicero et al. |
| 3,917,498 A | 11/1975 | O'Shima |
| 4,268,551 A | 5/1981 | Moore, Jr. |
| 4,337,283 A | 6/1982 | Haas, Jr. |
| 4,356,220 A | 10/1982 | Benedyk |
| 4,389,434 A | 6/1983 | Polman |
| 4,396,653 A | 8/1983 | Tomarin |
| 4,497,853 A | 2/1985 | Tomarin |
| 4,735,825 A | 4/1988 | Friedrich |

(Continued)

FOREIGN PATENT DOCUMENTS

| | | |
|---|---|---|
| CA | 2514684 | 2/2007 |
| CA | 2521150 | 2/2007 |

(Continued)

OTHER PUBLICATIONS

International Search Report and Written Opinion dated Mar. 26, 2010 in PCT/US2009/068090.

(Continued)

*Primary Examiner* — Jeffrey Wollschlager
(74) *Attorney, Agent, or Firm* — Robinson IP Law, PLLC (57) ABSTRACT

Disclosed herein is a method for recycling synthetic turf that includes agglomerating a plurality of synthetic turf fragments and extruding the agglomerated material. The method produces a recycled material suitable for use as infill in a synthetic turf. Accordingly, an infill for synthetic turf and a synthetic turf including that infill are also disclosed herein.

18 Claims, 3 Drawing Sheets

(56) References Cited

U.S. PATENT DOCUMENTS

| | | | |
|---|---|---|---|
| 4,738,407 A | 4/1988 | Arrant | |
| 4,882,208 A | 11/1989 | Breitscheidel et al. | |
| 5,009,586 A | 4/1991 | Pallmann | |
| 5,041,320 A | 8/1991 | Meredith et al. | |
| 5,185,380 A * | 2/1993 | Diessel et al. | 521/49 |
| 5,225,130 A | 7/1993 | Deiringer | |
| 5,288,349 A | 2/1994 | Fink | |
| 5,312,573 A * | 5/1994 | Rosenbaum et al. | 264/148 |
| 5,424,013 A | 6/1995 | Lieberman | |
| 5,565,158 A | 10/1996 | Sullivan et al. | |
| 5,591,802 A | 1/1997 | David et al. | |
| 5,848,940 A | 12/1998 | Yamada | |
| 5,859,071 A * | 1/1999 | Young et al. | 521/40.5 |
| 5,958,527 A | 9/1999 | Prevost | |
| 5,976,645 A | 11/1999 | Daluise et al. | |
| 6,029,397 A | 2/2000 | Motz et al. | |
| 6,173,528 B1 | 1/2001 | Motz et al. | |
| 6,221,445 B1 | 4/2001 | Jones | |
| 6,237,208 B1 | 5/2001 | Meeth | |
| 6,299,959 B1 | 10/2001 | Squires et al. | |
| 6,491,991 B2 | 12/2002 | Seaton | |
| 6,527,889 B1 | 3/2003 | Paschal et al. | |
| 6,551,689 B1 | 4/2003 | Prevost | |
| 6,582,819 B2 | 6/2003 | McDaniel et al. | |
| 6,590,042 B1 | 7/2003 | Tang | |
| 6,616,542 B1 | 9/2003 | Reddick | |
| 6,672,749 B2 | 1/2004 | Nicholls et al. | |
| 6,689,447 B2 | 2/2004 | Prevost | |
| 6,723,413 B2 | 4/2004 | Walters | |
| 6,740,387 B1 | 5/2004 | Lemieux | |
| 6,746,752 B2 | 6/2004 | Prevost | |
| 6,753,049 B2 | 6/2004 | De Vries | |
| 6,767,595 B2 | 7/2004 | Prevost et al. | |
| 6,793,164 B2 | 9/2004 | Stroppiana | |
| 6,797,216 B2 * | 9/2004 | Furgiuele et al. | 264/176.1 |
| 6,800,339 B2 | 10/2004 | Motz et al. | |
| 6,805,936 B2 | 10/2004 | Seaton | |
| 6,814,826 B1 * | 11/2004 | Bell | 156/94 |
| 6,818,274 B1 | 11/2004 | Buck et al. | |
| 6,855,650 B1 | 2/2005 | Bohannon, Jr. | |
| 6,881,793 B2 | 4/2005 | Sheldon et al. | |
| 6,884,509 B2 | 4/2005 | Huff et al. | |
| 6,887,535 B2 | 5/2005 | Stroppiana | |
| 6,936,201 B2 | 8/2005 | Desai et al. | |
| 6,950,599 B2 | 9/2005 | Nicholls et al. | |
| 6,951,670 B2 | 10/2005 | Stroppiana | |
| 6,955,841 B2 | 10/2005 | Weghuis et al. | |
| 6,989,179 B2 | 1/2006 | Prevost et al. | |
| 7,001,554 B2 | 2/2006 | Bohannon | |
| 7,060,334 B2 | 6/2006 | Stroppiana | |
| 7,081,283 B2 | 7/2006 | Straughn | |
| 7,144,609 B2 | 12/2006 | Reddick | |
| 7,153,553 B2 | 12/2006 | Tetrault | |
| 7,155,796 B2 | 1/2007 | Cook | |
| 7,166,340 B1 | 1/2007 | Clark | |
| 7,171,780 B1 | 2/2007 | Hudson | |
| 7,245,815 B2 | 7/2007 | Nicholls et al. | |
| 7,250,451 B2 | 7/2007 | Tang | |
| 7,264,854 B2 | 9/2007 | Stroppiana | |
| 7,273,642 B2 | 9/2007 | Prevost | |
| 7,300,689 B2 | 11/2007 | Prevost | |
| 7,306,838 B2 | 12/2007 | Prevost | |
| 7,357,966 B2 | 4/2008 | Dipple et al. | |
| 7,386,925 B2 | 6/2008 | Germer | |
| 7,399,514 B2 | 7/2008 | De Clerck | |
| 8,110,131 B1 * | 2/2012 | Dell'Orco et al. | 264/141 |
| 2001/0005958 A1 | 7/2001 | Casimaty | |
| 2001/0008322 A1 * | 7/2001 | Rosenbaum | 264/267 |
| 2001/0009710 A1 * | 7/2001 | Zegler et al. | 428/85 |
| 2001/0033902 A1 * | 10/2001 | Seaton | 428/15 |
| 2001/0046589 A1 | 11/2001 | Stroppiana | |
| 2001/0048177 A1 * | 12/2001 | Close et al. | 264/151 |
| 2002/0028307 A1 | 3/2002 | Prevost | |
| 2002/0029515 A1 | 3/2002 | Prevost | |
| 2002/0031653 A1 * | 3/2002 | Ricciardelli et al. | 428/297.4 |
| 2002/0039636 A1 * | 4/2002 | Fink et al. | 428/85 |
| 2002/0081399 A1 | 6/2002 | Prevost et al. | |
| 2002/0091011 A1 | 7/2002 | Sosin | |
| 2002/0096796 A1 | 7/2002 | Estrada | |
| 2002/0132067 A1 | 9/2002 | Cartwright et al. | |
| 2002/0159275 A1 | 10/2002 | Nicholls et al. | |
| 2003/0039773 A1 | 2/2003 | Paschal et al. | |
| 2003/0056432 A1 | 3/2003 | Prevost | |
| 2003/0106949 A1 | 6/2003 | Stroppiana | |
| 2003/0108688 A1 | 6/2003 | De Vries | |
| 2003/0118755 A1 | 6/2003 | Motz et al. | |
| 2003/0122283 A1 | 7/2003 | Estrada | |
| 2003/0157275 A1 | 8/2003 | Weghuis et al. | |
| 2004/0001951 A1 | 1/2004 | Slootweg et al. | |
| 2004/0013870 A1 | 1/2004 | Sheldon et al. | |
| 2004/0028841 A1 | 2/2004 | Motz et al. | |
| 2004/0033322 A1 | 2/2004 | Stroppiana | |
| 2004/0037975 A1 | 2/2004 | Stroppiana | |
| 2004/0214000 A1 | 10/2004 | Huff et al. | |
| 2004/0234719 A1 * | 11/2004 | Jones | 428/62 |
| 2005/0003193 A1 | 1/2005 | Stroppiana | |
| 2005/0008793 A1 | 1/2005 | Prevost | |
| 2005/0064112 A1 | 3/2005 | Nicholls et al. | |
| 2005/0096400 A1 | 5/2005 | Villwock et al. | |
| 2005/0130517 A1 | 6/2005 | Bohannon, Jr. | |
| 2005/0158482 A1 | 7/2005 | Cook | |
| 2006/0003893 A1 | 1/2006 | Pursell et al. | |
| 2006/0006564 A1 | 1/2006 | Maldas et al. | |
| 2006/0013989 A1 | 1/2006 | Stull et al. | |
| 2006/0045994 A1 | 3/2006 | Dipple et al. | |
| 2006/0093783 A1 | 5/2006 | De Clerck | |
| 2006/0100342 A1 | 5/2006 | Jensen | |
| 2006/0147670 A1 | 7/2006 | Reddick | |
| 2006/0148646 A1 | 7/2006 | Pursell et al. | |
| 2006/0172092 A1 | 8/2006 | Tetrault | |
| 2006/0204710 A1 | 9/2006 | De Vries | |
| 2006/0258811 A1 | 11/2006 | Barcus et al. | |
| 2007/0007682 A1 | 1/2007 | Maldas et al. | |
| 2007/0043128 A1 | 2/2007 | Jenkines et al. | |
| 2007/0049694 A1 | 3/2007 | Koch et al. | |
| 2007/0101566 A1 | 5/2007 | Cook | |
| 2007/0148398 A1 | 6/2007 | Stroppiana | |
| 2007/0154661 A1 | 7/2007 | Stroppiana | |
| 2007/0160800 A1 | 7/2007 | Reddick | |
| 2007/0166507 A1 | 7/2007 | Atsma et al. | |
| 2007/0275207 A1 | 11/2007 | Higgins et al. | |
| 2008/0020174 A1 | 1/2008 | Stull et al. | |
| 2008/0029917 A1 | 2/2008 | Maldas et al. | |
| 2008/0044598 A1 | 2/2008 | Stroppiana | |
| 2008/0044599 A1 | 2/2008 | Stroppiana | |
| 2008/0069642 A1 | 3/2008 | Ayers et al. | |
| 2008/0083103 A1 | 4/2008 | Germer | |
| 2008/0090955 A1 | 4/2008 | Lambert et al. | |
| 2008/0104914 A1 | 5/2008 | Lemieux | |
| 2008/0128933 A1 * | 6/2008 | Przybylinski et al. | 264/31 |
| 2008/0141516 A1 | 6/2008 | Julicher et al. | |
| 2008/0145574 A1 | 6/2008 | Julicher et al. | |
| 2008/0176009 A1 | 7/2008 | Chereau et al. | |
| 2008/0176010 A1 | 7/2008 | Sawyer et al. | |
| 2008/0182040 A1 | 7/2008 | Chereau et al. | |
| 2008/0187689 A1 | 8/2008 | Dierkens et al. | |
| 2008/0193226 A1 | 8/2008 | Jones et al. | |
| 2008/0206381 A1 | 8/2008 | Price | |
| 2008/0213515 A1 | 9/2008 | Vey et al. | |
| 2008/0219770 A1 | 9/2008 | Prevost et al. | |
| 2008/0248887 A1 | 10/2008 | Shaneour | |
| 2008/0260974 A1 | 10/2008 | Morton-Finger | |
| 2008/0260975 A1 | 10/2008 | Morton-Finger | |
| 2008/0268184 A1 | 10/2008 | Cook | |
| 2008/0274307 A1 | 11/2008 | Chereau et al. | |
| 2008/0280075 A1 | 11/2008 | Reijen | |
| 2008/0292819 A1 | 11/2008 | Weghuis et al. | |
| 2008/0299331 A1 | 12/2008 | Gilardi | |
| 2008/0317978 A1 | 12/2008 | Smit et al. | |
| 2009/0008824 A1 | 1/2009 | Satori et al. | |
| 2009/0011152 A1 | 1/2009 | Stroppiana | |
| 2009/0011845 A1 | 1/2009 | Weber et al. | |
| 2009/0286017 A1 * | 11/2009 | Horio et al. | 428/17 |
| 2010/0247814 A1 * | 9/2010 | Nisikawa et al. | 428/17 |

(56) References Cited

U.S. PATENT DOCUMENTS

FOREIGN PATENT DOCUMENTS

| | | |
|---|---|---|
| CA | 2597364 | 2/2008 |
| CA | 2639586 | 10/2008 |
| CN | 101135066 | 3/2008 |
| DE | 4130082 | 3/1992 |
| DE | 4120693 | 12/1992 |
| DE | 4136444 | 5/1993 |
| EP | 0136747 | 12/1986 |
| EP | 0259940 | 7/1992 |
| EP | 0848660 | 6/1998 |
| EP | 0906365 | 4/1999 |
| EP | 0737214 | 3/2001 |
| EP | 0996781 | 10/2002 |
| EP | 0899294 | 4/2003 |
| EP | 1319753 | 6/2003 |
| EP | 1378592 | 1/2004 |
| EP | 1389649 | 2/2004 |
| EP | 1394324 | 3/2004 |
| EP | 1353798 | 12/2004 |
| EP | 1591476 | 11/2005 |
| EP | 1486613 | 4/2007 |
| EP | 1803841 | 7/2007 |
| EP | 1889954 A1 | 2/2008 |
| EP | 1584644 | 3/2008 |
| EP | 1416009 | 7/2008 |
| EP | 1950350 | 7/2008 |
| EP | 1967651 | 9/2008 |
| EP | 1972703 | 9/2008 |
| EP | 1983104 | 10/2008 |
| EP | 2119829 | 11/2009 |
| EP | 1889954 B1 | 3/2010 |
| GB | 2155327 | 9/1985 |
| GB | 2196539 | 5/1988 |
| GB | 2372455 | 8/2002 |
| JP | 52070539 | 6/1977 |
| JP | 61098802 | 5/1986 |
| JP | 61102905 | 5/1986 |
| JP | 61130502 | 6/1986 |
| JP | 63063802 | 3/1988 |
| JP | 2167904 | 6/1990 |
| JP | 3072102 | 3/1991 |
| JP | 4120304 | 4/1992 |
| JP | 4120306 | 4/1992 |
| JP | 4197612 | 7/1992 |
| JP | 4309606 | 11/1992 |
| JP | 05200749 | 8/1993 |
| JP | 5302304 | 11/1993 |
| JP | 6193010 | 7/1994 |
| JP | 6240507 | 8/1994 |
| JP | 6240616 | 8/1994 |
| JP | 6280217 | 10/1994 |
| JP | 7137172 | 5/1995 |
| JP | 8000110 | 1/1996 |
| JP | 8003917 | 1/1996 |
| JP | 8120614 | 5/1996 |
| JP | 09003813 | 1/1997 |
| JP | 9041315 | 2/1997 |
| JP | 10018213 | 1/1998 |
| JP | 11209915 | 8/1999 |
| JP | 11293619 | 10/1999 |
| JP | 2000008314 | * 1/2000 |
| JP | 2000017605 | 1/2000 |
| JP | 2000314103 | 11/2000 |
| JP | 2001254310 | 9/2001 |
| JP | 2002192120 | 7/2002 |
| JP | 2002242120 | 8/2002 |
| JP | 2004060393 | 2/2004 |
| JP | 2004092111 | 3/2004 |
| JP | 2005002783 | 1/2005 |
| JP | 2006233596 | 9/2006 |
| JP | 2007327314 | 12/2007 |
| JP | 2008180074 | 8/2008 |
| JP | 2008220744 | 9/2008 |
| JP | 2008222952 | 9/2008 |
| KR | 19970010719 | 1/1996 |
| KR | 20070097446 | 10/2007 |
| KR | 100799262 | 1/2008 |
| KR | 100834039 | 5/2008 |
| KR | 100834040 | 5/2008 |
| SE | 510405 | 5/1999 |
| TW | 445333 | 7/2001 |
| WO | WO-9300396 | 1/1993 |
| WO | WO-9418394 | 8/1994 |
| WO | WO-9605374 | 2/1996 |
| WO | WO-9949137 | 9/1999 |
| WO | WO-0137657 | 5/2001 |
| WO | WO-0209825 | 2/2002 |
| WO | WO-0234860 | 5/2002 |
| WO | WO-2004015009 | 2/2004 |
| WO | WO-2004109017 | 12/2004 |
| WO | WO-2005042135 | 5/2005 |
| WO | WO-2005047602 | 5/2005 |
| WO | WO-2005073297 | 8/2005 |
| WO | WO-2006092337 | 9/2006 |
| WO | WO-2006109110 | 10/2006 |
| WO | WO-2006136436 | 12/2006 |
| WO | WO-2007010324 | 1/2007 |
| WO | WO-2007039191 | 4/2007 |
| WO | WO-2008033342 | 3/2008 |
| WO | WO-2008033343 | 3/2008 |
| WO | WO-2008051073 | 5/2008 |
| WO | WO-2008057881 | 5/2008 |
| WO | WO-2008057886 | 5/2008 |
| WO | WO-2008098905 | 8/2008 |
| WO | WO-2008115085 | 9/2008 |
| WO | WO-2008125895 | 10/2008 |
| WO | WO2009078128 | * 6/2009 |
| WO | WO-2010075098 | 7/2010 |

OTHER PUBLICATIONS

International Preliminary Report on Patentability dated Jun. 30, 2011 in PCT/US2009/068090.

* cited by examiner

METHOD OF RECYCLING SYNTHETIC TURF AND INFILL PRODUCT

CROSS REFERENCE TO RELATED APPLICATIONS

This application claims priority to U.S. Provisional Application No. 61/122,592 filed Dec. 15, 2008, which is hereby incorporated by reference in its entirety.

FIELD OF THE INVENTION

This application is related to the field of synthetic turf, and more particularly to methods of recycling synthetic turf and infill materials produced thereby.

BACKGROUND

Synthetic turf has been used for years in athletic playing surfaces such as football, baseball, and soccer fields, and has more recently been used in other applications where an alternative to natural grass is desired. These applications include at least playgrounds, residential and commercial lawns and other landscaping, jogging paths, paintball fields, tennis courts, putting greens, and dog runs. Typically, synthetic turf includes a pile fabric having a backing and a plurality of upstanding ribbons, also called face fibers or filiform formations, resembling grass. Many synthetic turf products also include an infill material dispersed among the upstanding ribbons, which may consist of sand, tire rubber crumb, or other particulates, either singularly or in combination with each other. The infill material simulates the soil in natural turf, acts as a ballast, and/or contributes to the physical properties of the turf, such as resiliency, that make the turf suitable for a particular use.

Synthetic turf has a limited useful life, the length of which depends on the construction of the turf, the application for which it is used, and how the turf is maintained. As an example, a typical synthetic turf for use as an athletic field may have a useful life of from about 8 to 15 years. A large amount of synthetic turf is currently being used in hundreds of athletic fields and in other applications. To avoid sending that turf to landfills at the end of its useful life, there is a need for a method of recycling and reusing all or portions of the synthetic turf. There is also a need for a synthetic turf that is recyclable.

Recycling of a product typically refers to converting that product into a material or product for another use or extracting at least one of the individual components or materials of the product for use of that component or material in another product. The recycled product may be used in a similar product, such as when paper products are recycled to make other paper products, or may be used in a completely different product, such as when tires are recycled to make asphalt.

Methods for recycling carpet and for preparing carpet backing using recycled carpet scrap are known. Some such methods involve separating the carpet yarns, or tufts, from the backing, e.g. by cutting, and processing only the tufts to recover any nylon. In another recycling process the tufts can be spun into a new yarn for use in carpet or other textiles. One problem with these methods is that only the face fibers are recycled and the backing must be otherwise disposed of. Other methods of recycling carpets include grinding carpet scrap, including the backing, into a fine powder. The powder is then introduced into a carpet backing formulation which may be a precoat, laminate coating, skip coating, or foam coating. The formulation is then applied to a substrate, and cured by heating or drying. One problem with these processes for recycling carpet is that recycled material can make up only about 5% by weight of the carpet backing into which the recycled material is incorporated. This corresponds to approximately 2.5% by weight of a broadloom carpet.

Synthetic turf differs in composition from carpet, and those differences in composition make conventional carpet recycling processes unsuitable for recycling synthetic turf. The majority of carpet products use nylon face fibers, while the majority of current synthetic turf products use polyethylene. The primary coating of most broadloom carpet is a latex coating, while the primary coating in most synthetic turf is polyurethane. In the United States, only a small fraction of broadloom carpet includes a coating containing polyurethane, and only a small fraction of synthetic turfs have a coating containing latex.

Most of the synthetic turf manufactured in the past 6 years has had a polyurethane coating applied to the backing. There is a belief that polyurethane coated synthetic turf as a whole cannot be recycled. This is because the polyurethane coating, according to conventional wisdom, cannot be recycled. Polyurethane is thermoset (versus thermoplastic) and is therefore difficult and costly to recycle. Polyurethane is the reaction product of a polyol and an isocyanate. When these chemicals are mixed together and cured they form a solid polyurethane. The combination is applied to the backing of a tufted material for the purpose of locking the face fibers into the primary backing. An additional coating of a hot melt adhesive or a polyurethane foam can also be applied. This secondary coating is typically used to attach a secondary backing which can be polyester or polypropylene.

Many synthetic turf products include components that are not found in carpet and that are incompatible with, or at least undesirable in, conventional carpet recycling methods. For example, conventional carpet does not include infill. Typical infill materials for synthetic turf installations include sand, tire rubber crumb, and/or other particulates, either singularly or in combination with each other. Thus, recycling synthetic turf presents a unique problem not encountered in the recycling of carpet. Separating infill from the remainder of the turf may require use of special equipment, and there may be environmental concerns associated with disposing of the separated infill. Additional concerns in the recycling process are the effect of any residual infill particulates on the size reduction process and on the properties of the final product.

Conventional carpet recycling methods provide end products that are inconsistent with or that are not ideal uses of recycled synthetic turf. For example, nylon carpet recycling is focused primarily on separating and recovering the nylon, which is of greater value than other carpet components. In contrast, current synthetic turf typically contains little or no nylon. Additionally, conventional carpet recycling methods produce, as described above, a dry powder that can be incorporated in small amounts into carpet backings. Alternatively, for synthetic turf recycling, it is desirable to recover and reuse most or all of the synthetic turf, and to do so in a way that the recycled synthetic turf makes up a large percentage of the turf into which it is incorporated.

There remains a need for a method of recycling and reusing an existing synthetic turf, or at least a portion of an existing synthetic turf, to avoid sending the entire synthetic turf to a landfill when it is no longer useful. There is also a need for a synthetic turf that can be recycled and reused.

SUMMARY

Embodiments of this invention include methods for recycling and reusing synthetic turf. Final products of embodiments of the disclosed recycling methods are materials that can be used as synthetic turf infill.

Embodiments of this invention include methods of recycling synthetic turf including agglomerating synthetic turf fragments to form granules, placing the granules in an extruder, and extruding the granules to form an extrudate, for example a strand or ribbon. Embodiments of this invention eliminate the need to separate all of the infill from synthetic turf before the turf is recycled by providing a method of recycling synthetic turf that is effective even if the turf contains at least some infill material, such as sand and/or rubber.

Other embodiments of this invention provide infill for a synthetic turf. Infill of these embodiments includes pellets comprising (a) polyethylene, polypropylene, or nylon or a combination thereof; (b) polyester or polypropylene or a combination thereof; and (c) polyurethane, latex, hot melt, or a thermoplastic, or a combination thereof. The infill may further include a filler, or a modifier, or combination thereof. Embodiments of this invention eliminate the need to separate infill from synthetic turf before recycling by providing a synthetic turf product having an infill material that itself is made from recycled materials and is recyclable. This infill material may also be separated from the synthetic turf and reused as infill instead of being disposed in a landfill.

In yet other embodiments, this invention provides synthetic turf including any infill as described herein. In some embodiments, the synthetic turf includes the infill described herein and also includes additional infill materials such as sand, gravel, polymer beads, rubber, or any infill material known in the art.

DETAILED DESCRIPTION

Embodiments of this invention provide methods of recycling and reusing an existing synthetic turf or a portion of an existing synthetic turf. Other embodiments of this invention provide infill for a synthetic turf wherein the infill is recyclable and can be incorporated into a synthetic turf such that the synthetic turf may be recycled and reused.

Typically, synthetic turf includes a pile fabric having a backing and a plurality of upstanding ribbons, also called face fibers or filiform formations, resembling grass. Typically, the upstanding ribbons are made of polyethylene, polypropylene or a blend thereof. The ribbons may also be made of nylon or any other material known in the art alone or in combination with polypropylene and/or polyethylene. These face fibers are tufted or sewn into a primary backing material which can be made of a number of different materials including, but not limited to, polypropylene and polyester. A primary coating material, or precoat, is applied to the fiber and primary backing to hold the face fibers in place. The primary coating of most synthetic turfs includes polyurethane and also typically includes a filler such as calcium carbonate or coal fly ash. Primary coatings may also include latex, hot melt adhesives, and/or thermoplastics in addition to or instead of polyurethane. Synthetic turfs may also have a secondary coating which may be similar to the primary coating described herein. Synthetic turfs may also have a secondary backing which can be made of a number of different materials including, but not limited to, polypropylene and polyester.

The face fibers typically make up from about 19 wt % to about 80 wt % of a synthetic turf. The primary backing typically makes up from about 1 wt % to about 25 wt % of a synthetic turf. The primary coating typically makes up from about 15 wt % to about 80 wt % of a synthetic turf.

Synthetic turf may also include an infill material dispersed among the upstanding ribbons, which acts as a ballast and/or contributes to the physical properties of the turf, such as resiliency, that make the turf suitable for a particular use. Synthetic turf infill may be made of any material suitable for providing desired physical properties for the synthetic turf, but most often includes materials such as sand, gravel, cork, polymer beads, and rubbers, including but not limited to crumb rubber, ethylene propylene diene monomer (EPDM) rubber, and neoprene rubber.

The face fibers may include polyethylene, polypropylene, nylon, or other materials singly or in combination. The face fibers may include from about 0 wt % to about 100 wt % polyethylene, from about 0 wt % to about 100 wt % polypropylene, and from about 0 wt % to about 100 wt % nylon. In some embodiments, the face fibers include blends of polypropylene (PP) and polyethylene (PE) in any of the following ratios of PP:PE—5:95; 10:90; 50:50; 90:10; 95:5 or any ratio that is within these ranges of ratios. In some embodiments, the face fibers include blends of PP and nylon in any of the following ratios of PP:nylon—5:95; 10:90; 50:50; 90:10; 95:5 or any ratio that is within these ranges of ratios. In some embodiments, the face fibers include blends of PE and nylon in any of the following ratios of PE:nylon—5:95; 10:90; 50:50; 90:10; 95:5 or any ratio that is within these ranges of ratios. In some embodiments, the face fibers include blends of PP, PE, and nylon in any of the following ratios of PP:PE:nylon—10:10:80; 10:80:10; 80:10:10; 33:33:33 or any ratio that is within these ranges of ratios.

The primary backing may include polyester, polypropylene, and other materials singly or in combination. The primary backing may include from about 0 wt % to about 100 wt % polyester or from about 0 wt % to about 100 wt % polypropylene. In some embodiments, the primary backing includes blends of PP and polyester in any of the following ratios of PP:polyester—5:95; 10:90; 50:50; 90:10; 95:5 or any ratio that is within these ranges of ratios The primary coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.). Suitable thermoplastics include, but are not limited to polypropylene, polyethylene and polyester. The primary coating may also include a filler that may be coal fly ash, calcium carbonate, iron oxide, or barium sulfate, or any other filler known in the art. The primary coating may include from about 0 wt % to about 100 wt % polyurethane, from about 0 wt % to about 100 wt % latex, from about 0 wt % to about 100 wt % hot melt adhesive, and/or from about 0 wt % to about 100 wt % thermoplastic. The primary coating may include from about 0 wt % to about 80 wt % filler. In some embodiments, the primary coating includes polyurethane, latex, or thermoplastic and from about 20 wt % to about 80 wt % filler, or from about 40 wt % to about 60 wt % filler. In other embodiments, the primary coating includes hot melts and from about 0 wt % to about 50 wt % filler, or from about 1 wt % to about 25 wt % filler. Several embodiments of primary coating and secondary backing compositions are shown below in Table 1.

TABLE 1

| Sample | Polyurethane wt % | Latex wt % | Hot Melt wt % | Polypropylene wt % | Polyester wt % |
|---|---|---|---|---|---|
| 1 | 10-70 | | 10-40 | 5-40 | |
| 2 | 30-97 | | | | 3-70 |
| 3 | 10-70 | | 10-40 | | 5-40 |
| 4 | 30-97 | | | 3-70 | |
| 5 | 10-70 | 10-40 | | 5-40 | |
| 6 | | 30-97 | | | 3-70 |
| 7 | | | 30-97 | | 3-70 |
| 8 | 10-70 | 10-40 | | | 5-40 |
| 9 | | 30-97 | | 3-70 | |
| 10 | | | 30-97 | 3-70 | |

The methods described herein may be used to recycle and reuse synthetic turf, including turf described above, or other synthetic surfaces having chemical make-up similar to synthetic turf.

Recycling synthetic turf begins with the removal of the material from the point of installation. Typically for a sports field, the synthetic turf is installed by unrolling a 15 foot wide by 150 foot long roll of turf. A field typically requires multiple rolls, which are laid out on the field side by side and seamed together to form the field. Infill is then installed. The infill may be one or more of sand, rubber, and/or any other suitable material as described previously. When a synthetic turf is removed, typically some of the infill is separated from the remainder of the infill. The infill may be removed prior to the removal of the turf or at the same time. For example, a machine may collect the infill and place it into a container or onto the field. The turf and infill may be removed at the same time by a machine or by hand. The turf is cut and the infill is dumped out. The turf is then downsized into sections (e.g. 1 by 1 foot for ease and efficiency of shipping) that can be accepted by the next process. The downsizing may be accomplished by hand or machine. The machine may be large or small and may use rotary blades or knifes or any of a variety of different methods known in the art. The downsized pieces, also referred to as turf fragments, are typically placed on pallets and shipped to a recycling facility.

One method of recycling synthetic turf is described below. A plurality of synthetic turf fragments are agglomerated. The granules of agglomerated turf fragments are placed into an extruder. The granules are extruded to form an extrudate, for example in the shape of a strand or ribbon.

In some embodiments, the downsized pieces of synthetic turf are placed into an agglomerator. Suitable agglomerators include Condux agglomerators, Netplasmak NPS agglomerators, or tub densifiers. The downsized pieces of turf should be of a size suitable for agglomeration. A suitable size will depend on the agglomeration equipment employed. For example, agglomerating equipment such as a Condux can accept sizes of up to 2 square feet. In some embodiments, the synthetic turf fragments are equal to or less than about 1 square foot. In some embodiments, the turf fragments are less than 6 square inches. In some embodiments, the turf fragments are less than 3 square inches.

The step of agglomerating the turf fragments involves using mechanical energy to densify the components of the turf fragments into smaller and denser granules. During agglomeration, some of the synthetic turf components are mechanically melted. In some embodiments, no heat is added during agglomeration; however, frictional forces cause the lower melting components to melt. Lower melting components include any components that melt as a result of the mechanical mixing during the agglomeration process, and in some embodiments include polyethylene and polypropylene. Agglomeration may also include further reduction in the size of the turf fragments, and particularly of the high melting components. For example, in some embodiments polyurethane does not melt, but is reduced to a powder. During agglomeration, higher softening components, such as polyurethane and rubber, may be encapsulated by the lower melting components. The rate of agglomeration depends on a variety of factors including at least the size of the turf fragments and the composition of the turf fragments. In some embodiments the rate of agglomeration is from about 50 to about 2000 lbs/hour, or from about 100 to about 500 lbs/hour, or from about 250 to about 350 lbs/hour. In one embodiment, the agglomeration process produces granules of agglomerated material. These granules have the same or very similar chemical composition as the starting synthetic turf fragments.

As an example of the agglomeration process, in one embodiment, downsized material (i.e. turf fragments) is fed into the Condux machine by hand or by belt into a shredder which cuts the turf fragments into smaller pieces. The shredder uses a rotary blade inside a steel box to cut the downsized material into smaller pieces. These smaller pieces are then transferred to a holding box where the material falls through a screen which allows through only pieces of a set size or smaller. The larger pieces are blown back to the shredder to be further downsized. As the material passes through the screen it is fed into a screw or auger which feeds the material between two steel plates that face each other, one twists and the other is stationary. The plates are shaped to have room in the center and are close together at the edge which generates friction and heat to soften the material. As the material softens it combines with any other material present. The combination of materials is pushed out of the plates as a strand or in small pieces which can be further downsized if needed. No heat is added during the process; however, the material can reach temperatures ranging from approximately 250° F. to 400° F. due to the mechanical energy. The agglomerated pieces are transferred to a screen for sizing. Those that pass through are boxed. The larger agglomerated pieces are sent to another shredder and then collected. The agglomerated material may be in the form of granules.

In some instances, it may be desirable to add fillers, modifiers, colorants, or other additives to the granules of agglomerated material prior to extrusion. In some embodiments, these additives may aid in extrusion of the agglomerated material and/or impart desired properties to the pellets of extruded product. Accordingly, in one embodiment of the present invention the disclosed method further includes the step of adding fillers, modifiers, or other additives. These additives may be added prior to or during the extrusion process. When the additives are added prior to extrusion, they are premixed with the granules of agglomerated material and added to the extruder. In other embodiments, the additives may be added during extrusion. One of skill in the art can determine for a given process, whether it is advantageous to add the additives prior to or during extrusion. One factor in this determination may be the type of extruder used. For example, twin screw extruders can efficiently mix the granules of agglomerated turf material and additives together during extrusion.

Fillers may include but are not limited to calcium carbonate, coal fly ash, iron oxide, or barium sulfate, or other fillers known in the art. Modifiers, colorants, or other additives that are suitable for use with the present invention include, but are not limited to, plasticizers, elastomers, compatibilizers, colorants, antimicrobials, and UV stabilizers. Examples of modifiers that can be used are: wax:, EPDM rubber; high and low density polyethylene; high and low density polypropylene; ExxonMobil Vistamaxx™ 6102, ExxonMobil Vistamaxx 3000 Propylene-based elastorner, ExxonMobil Exact 9361 ethylene-based plastomer resin, and ExxonMobil Exact 9371 ethylene-based plastomer resin (all available from Exxon Mobil Chemical, Houston, Tex.); Faraprene 381-35A (available from O'Neil Color and Compounding, Jasper, Tenn.); and any number of other modifiers. Suitable colorants include dyes and pigments; red, green, blue, black or any number of different colors can be added. However, in some embodiments, colorants may have very little effect due to the dark nature of the material.

In some embodiments, granules of agglomerated material make up from about 10 wt % to about 90 wt % of the material that is extruded. In some embodiments, the amount of filler added prior to or during extrusion is from about 10 wt % to about 90 wt % of the material that is extruded. In some embodiments, the amount of filler added prior to or during extrusion is from about 10 wt % to about 70 wt % or from about 10 wt % to about 50 wt % of the material that is extruded. In some embodiments, the amount of modifier added prior to or during extrusion is from about 10 wt % to about 90 wt % of the material that is extruded. In some embodiments, the amount of modifier added prior to or during extrusion is from about 10 wt % to about 70 wt % or from about 10 wt % to about 50 wt % of the material that is extruded. In some embodiments, the amount of colorant added prior to or during extrusion is from about 1 wt % to about 10 wt % of the material that is extruded.

The step of extruding the agglomerated turf material may be carried out with any equipment suitable for extrusion. A number of different extruders may be used for this process depending upon the type of mixing or heating that is desired. Examples of suitable extruders include single screw and twin screw extruders. The twin screw extruder may have co-rotating or counter rotating screws and the single screw extruder has one rotating screw. The screws can be designed to do a multitude of things but having the capacity to heat and mix the material is essential. Extruders typically have variable screw speeds and variable heating as well as variable feed rates. The appropriate speed and heat rate is determined by the type of output desired.

Extrusion is carried out at elevated temperatures. In some embodiments the temperature during extrusion is between about 200° F. and about 500° F., or between about 250° F. and about 450° F. In some embodiments the temperature during extrusion is between about 350° F. and about 400° F. In some embodiments the rate of extrusion is from about 3 to about 50,000 lbs/hour, or from about 100 to about 500 lbs/hour, or from about 300 to about 500 lbs/hour. Extrusion can be carried out using any size die that will provide a product of the desired size, but in some embodiments is carried out using a die that is between about 102 and about 305 mm in diameter.

In some embodiments, the extrudate is cut into pellets or granules. Suitable equipment for pelletizing includes, but is not limited to, pelletizers made by Gala Industries Inc. (Eagle Rock, Va.). In some embodiments, the extrudate is cut into pellets immediately after it emerges from the die and may be simultaneously cooled using water. In other embodiments, the extrudate is extruded into a water bath and is then cut into the desired size and shape. In some embodiments, the final product of the extrusion step is pellets of any desired shape including, but not limited to, spherical, cylindrical, or oval/football shaped. The pellets may also be of an irregular shape. This irregular shape might be advantageous, for example, to aid tight packing of the granules. The size and quantity of the pellets produced depends upon the speed of the extruder and the cutting system. In some embodiments, pellet sizes vary from 0.05 mm to 9 mm. In some embodiments, pellet sized vary from 1 mm to 6 mm or from 1 mm to 3 mm. In one embodiment the pellets are around 200 pellets per gram with a football shape.

As an example of the extrusion process, in one embodiment, agglomerated material (granules) is mixed with a calcium carbonate filler and a modifier, Exxon 6102. The mixture is 50 wt % agglomerated material, 10 wt % calcium carbonate, and 40 wt % Exxon 6102. The mixture is poured into the feed system of an extruder. The mixture is heated to 400° F. and mixed at 500 rpm's. The duration of mixing relates to the size of the extruder and the speed of operation. The mixture is then pushed out of the extruder by the screws through a plate on the end of the extruder. The plate has a multiplicity of small holes which may vary in size from about 0.5 mm to about 15 mm, through which the material is extruded. Strands of extruded material are produced. In one embodiment, the strands are then cooled in a water bath and cut by a strand cutter producing a pellet that has irregular edges. In another embodiment, the strands are fed into a water ring which cuts the strands and drops the pellet into water. This process can produce a football shaped pellet. In another embodiment, the strands are fed into a Gala cutting system that cuts the strand underwater, which produces a round pellet of about 0.05 mm to about 3 mm.

In one embodiment, the disclosed method further includes the step of separating at least 90% of non-recyclable components from the synthetic turf before the step of agglomerating the synthetic turf fragments. Many conventional synthetic turfs include large quantities of infill materials such as sand, gravel, and rubber. These materials, however, are not generally considered recyclable and are not favored for use in the recycling method described herein. Accordingly, in some instances, it may be desirable to remove at least some of the infill, or other components, of an existing synthetic turf before subjecting that synthetic turf to the recycling method described above. Separating the non-recyclable infill or other non-recyclable components may be accomplished before or after the synthetic turf is size reduced to turf fragments. In some embodiments, a portion of non-recyclable infill material is separated from the remaining synthetic turf. In some embodiments, at least 80% of the non-recyclable infill material is separated from the remaining synthetic turf. In some embodiments, at least 90% of the non-recyclable infill material is separated from the remaining synthetic turf. In some embodiments, at least 95% of the non-recyclable infill material is separated from the remaining synthetic turf. In some embodiments, at least 98% of the non-recyclable infill material is separated from the remaining synthetic turf.

One of skill in the art would recognize that the methods disclosed herein are not limited to use with synthetic turf, but are suitable for recycling other products made of similar materials.

Embodiments of this invention also provide infill for a synthetic turf. In some embodiments, the infill includes a material (for example particles or pellets) made from recycled synthetic turf. The terms particle and pellet are used interchangeably herein. In some embodiments, the infill is made by a process described herein.

In one embodiment the infill is a pellet or particle that is a mixture (a) polyethylene, polypropylene, or nylon or a combination thereof; (b) polyester or polypropylene or a combination thereof; and (c) polyurethane, latex, hot melt, a thermoplastic, polypropylene or polyethylene or a combination thereof. The pellets may include any component used in a synthetic turf, including but not limited to components used as the face fibers, the primary backing, the primary coating, and the infill as described previously herein. In some embodiments, sand, gravel, and rubber are present only as impurities and make up less than about 5 wt % of the infill pellets. In some embodiments, sand, gravel, and rubber make up less than 2 wt % of the infill pellets. In some embodiments, sand, gravel, and rubber are not present in the infill pellets.

In some embodiments the infill pellets of the present invention include: from about 19 wt % to about 80 wt % PE, PP, or nylon, or a combination thereof; from about 1 wt % to about 25 wt % PP or polyester, or a combination thereof; and from about 15 wt % to about 80 wt % polyurethane, latex, hot melt, or thermoplastic, or a combination thereof.

In some embodiments, infill pellets of the present invention include from about 10 wt % to about 90 wt % of recycled synthetic turf material. The percentage of recycled material in the final product may vary depending on the intended use for the pellets. For example, if more filler or modifier is required for a given use, the percentage of filler would be higher and the percentage of recycled material in the pellets would necessarily be lower. In some embodiments the infill functions as a ballast material. This infill may need more filler to increase the specific gravity of the pellets. In other embodiments, a material to be used as an infill for a playing surface may require less filler, but may also require additives for softness. The increased percentage of additives will influence the percentage of recycled material in the infill.

The pellets may be any desired shape. For example, in some embodiments the pellets can be substantially spherical, cylindrical, oval/football shaped, or may be an irregular shape. Different shapes may be advantageous for different uses. For example, irregularly shaped pellets may more efficiently than regularly shaped pellets. The extent of packing of the pellets can affect the physical properties of a synthetic turf that includes the pellets. The pellets may be any desired size but is typically from about 0.5 mm to about 9 mm. In some embodiments, the infill pellets are between about 1 mm and about 6 mm, or between about 1 mm and about 3 mm.

In some embodiments, the pellets are elastomeric. In some embodiments the durometer, or hardness, of the pellets may be between about 50 and about 100 using Shore OO. In some embodiments the density of the pellets is between about 40 to about 400 pellets/gram, or from about 2.5 to about 25 mg per pellet.

In some embodiments, the pellet is a mixture of components wherein the mixture has two or more phases. For example, the mixture may be a heterogeneous dispersion having a continuous phase and at least one disperse phase. The continuous phase includes lower melting components that have been melted and blended in a process such as agglomeration. The continuous phase may also be a mixture of these lower melting components and filler, such as calcium carbonate. The disperse phase includes higher melting components such as rubbers that are at least partially surrounded by the lower melting components of the continuous phase.

The physical properties of the pellets described herein can be adjusted by one skilled in the art at least by varying the size of the pellets, the shape of the pellets, and/or the composition of the pellets. For example, one of skill in the art would understand that the properties of the pellet may be adjusted by adjusting the amount of filler, additive, and/or modifiers. Thus, the pellets described herein can be made to have any desired physical property and are, thus, suitable for use in any synthetic turf.

Another embodiment of the invention is a synthetic turf that includes any of the pellets described above. This synthetic turf is suitable for a variety of uses, including but not limited to, athletic fields, landscaping, dog runs, putting greens, jogging paths, paintball fields, tennis courts, and playgrounds. Desired properties for a synthetic turf vary depending on the intended use of the turf. For example, depending on the intended use of the turf, one might prefer a softer surface (e.g. for playgrounds), a harder surface (e.g. for putting greens), or a surface that allows ideal ball bounce and/or ball roll (e.g. for athletic fields). Pellets described herein can be used to impart a variety of advantageous properties to synthetic turfs.

One important property of a synthetic turf is its capacity to absorb an impact, called the surface absorption, or G-Max. In some embodiments, synthetic turfs including the infill described herein have G-max values from about 75 to about 200. In some embodiments, the G-max values are from about 90 to 130.

A related property is the hardness of the synthetic turf. One measurement of the hardness of a synthetic turf is the force reduction value, also called the kraftabbau value. In some embodiments, synthetic turfs including the infill described herein have force reduction values from about 50 to about 75. In some embodiments, the force reduction values are from about 55 to about 70.

In some embodiments, a synthetic turf including infill pellets as described herein may also include another type of infill. This other type of infill may be any other infill used in synthetic turf including but not limited to sand, gravel, cork, polymer beads and rubbers. In some embodiments, multiple types of infill may be mixed together in a single layer in the synthetic turf. In other embodiments multiple types of infill may be disposed in a synthetic turf individually as discrete layers. Still other embodiments may include some combination of mixing and layering different types of infill.

Figure 1:
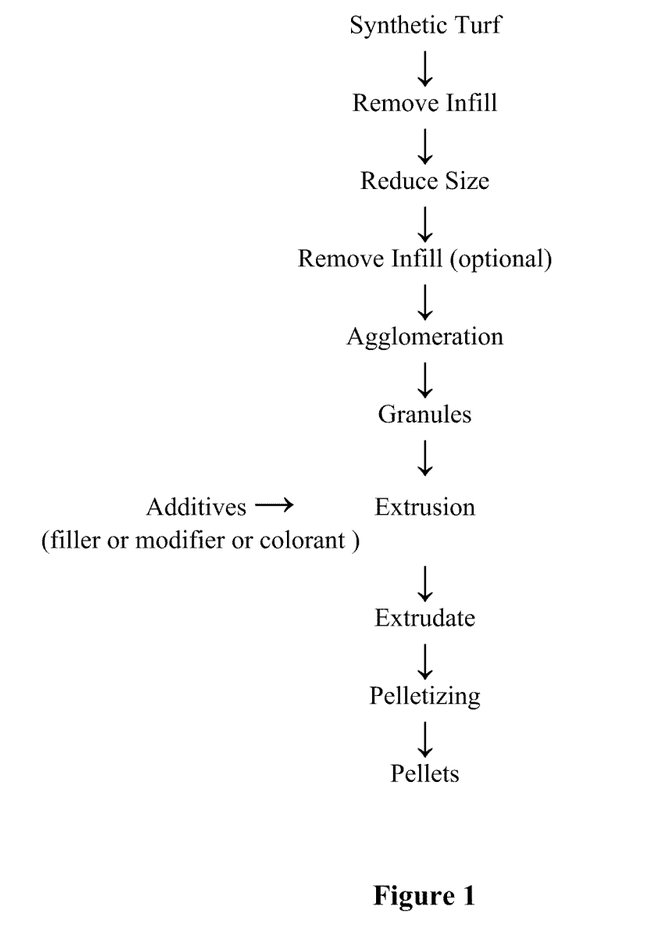
FIG. 1 is a flow chart of a process for recycling synthetic turf.

FIG. 1 is a flow chart showing a process for recycling synthetic turf.

Figure 2:
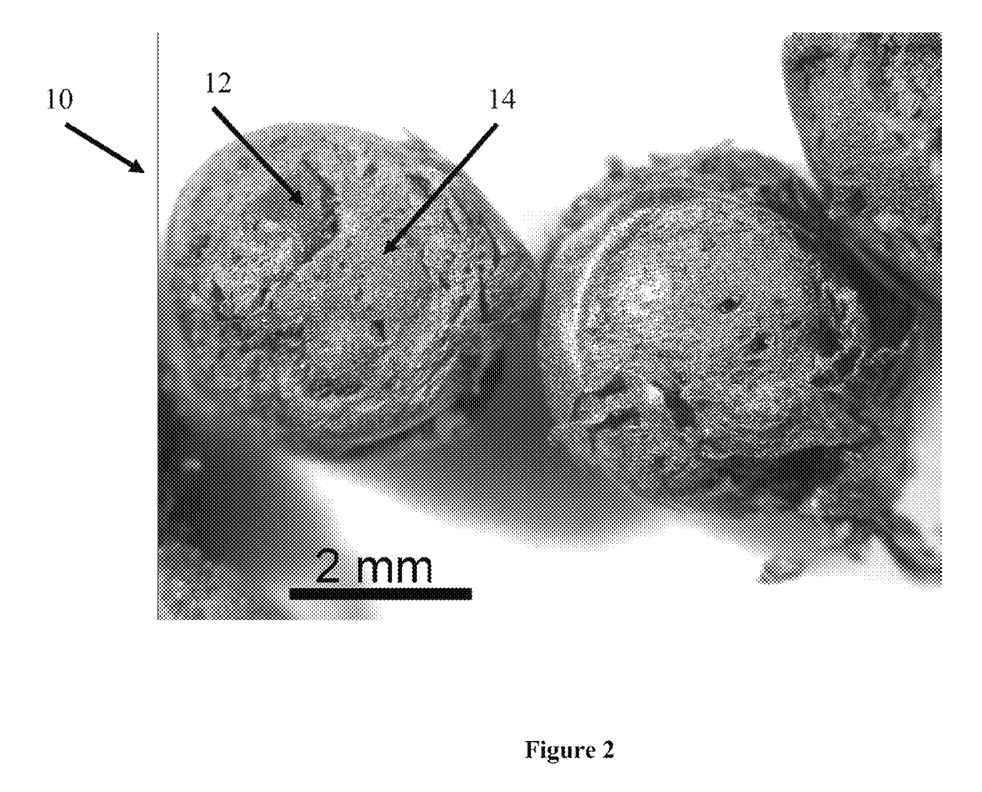
FIG. 2 illustrates infill pellets according to one embodiment of the present invention.

FIG. 2 is a brightfield reflected light image showing the surface of an infill pellet 10 according to one embodiment of the present invention. A disperse phase 12 appears as the dark inclusion on the surface of the infill pellet 10. The continuous phase 14 appears as lighter area of the surface of the infill pellet 10. In this embodiment, the disperse phase 12 includes butadiene rubber, and the continuous phase 14 includes polyethylene, polypropylene and calcium carbonate filler.

Figure 3:
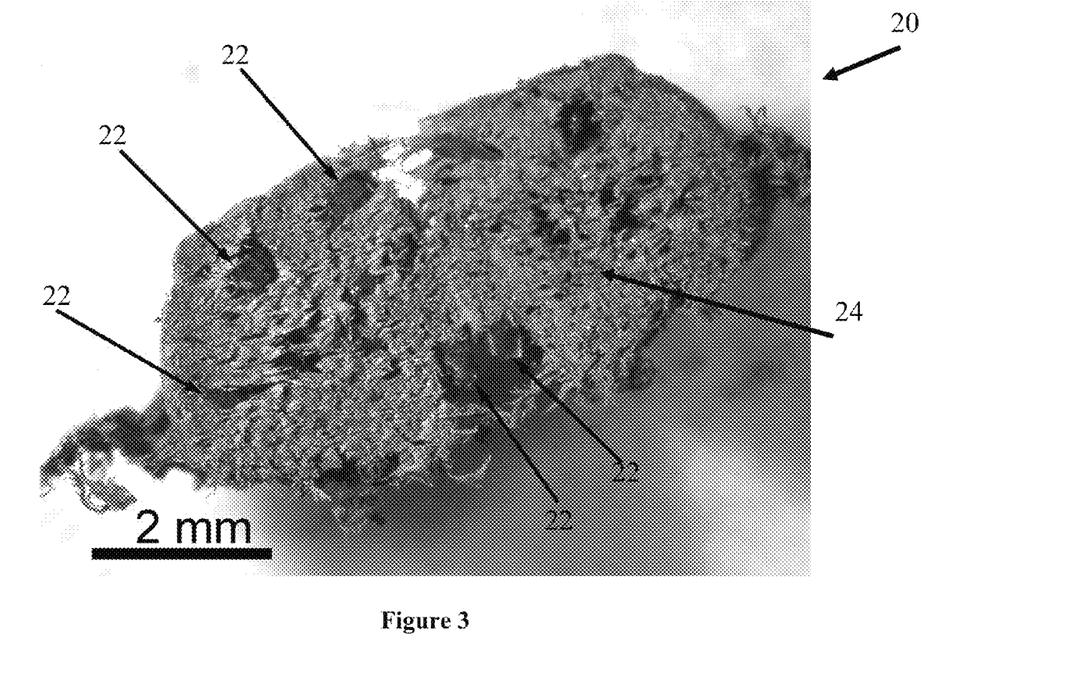
FIG. 3 is a cross-section of an infill pellet according to one embodiment of the present invention.

FIG. 3 is a brightfield reflected light image showing a cross-section of an infill pellet 20 according to one embodiment of the present invention. The pellet was cut at room temperature with a razor before the image was taken. As in FIG. 1, the disperse phase 22 appears as dark inclusions in the cross section of the infill pellet 20. The continuous phase 24 appears as the lighter areas of the infill pellet 20.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

EXAMPLE 1

Agglomerated material (granules), 50%; wax, 25%; calcium carbonate, 24%; and green dye, 1% were mixed together. The mixture was processed through a twin screw extruder at a temperature of between about 250° F. and about 450° F. at about 300 rpm for 10 to 20 seconds and strand cut. The pellet count was approximately 85 pellets per gram, or about 11.8 mg/pellet.

EXAMPLE 2

Agglomerated material (granules), 45%; Faraprene 381-35A, 45%; and calcium carbonate, 10% were processed through a twin screw extruder at a temperature of between about 250° F. and about 450° F. at about 300 rpm for 10 to 20 seconds and cut with a Gala underwater cutter. The pellet count was approximately 185 pellets per gram, or about 5.4 mg/pellet.

EXAMPLE 3

A mixture of agglomerated material (granules), 50% and Exxon 6102, 50% was processed through a twin screw extruder at a temperature of about 250° F. to about 450° F. at about 300 rpm for 10 to 20 seconds and cut with a strand cutter. The pellet count was approximately 85 pellets per gram, or about 11.8 mg/pellet.

EXAMPLE 4

The pellets from Example 1 were placed into a sample of synthetic turf. The turf sample was placed on a LisPort tester and tested. The material flattened quickly and the test was stopped before completion. No further data was generated from this sample.

EXAMPLE 5

The pellets from Example 2 were placed into a sample of synthetic turf. The turf sample was placed on a LisPort tester and tested for 80 hours. A G-max test was performed before, during, and after the LisPort testing to check the integrity of the turf sample and the pellets. The turf and the pellets both appeared to have little wear after the testing. G-max data for this test is shown in Table 2. Concrete and stone refer to the base that the turf is sitting on when tested.

TABLE 2

| | 0 hours | | 24 hours | | 32 hours | |
|---|---|---|---|---|---|---|
| Sample | Concrete | Stone | Concrete | Stone | Concrete | Stone |
| 2 | 132 | 120 | n/a | 141 | 174 | 116 |
| 3 | 143 | 124 | n/a | 146 | 120 | 136 |

| | 40 hours | | +0 hours | | 80 hours | |
|---|---|---|---|---|---|---|
| Sample | Concrete | Stone | Concrete | Stone | Concrete | Stone |
| 2 | 237 | 149 | 129 | 121 | 156 | 164 |
| 3 | 180 | 162 | 147 | 125 | 137 | 152 |

EXAMPLE 6

The pellets from Example 2 were placed on the Roll Stool and tested. The Roll Stool is a test apparatus for wear testing the durability of floor coverings. The sample was tested to 10,000 cycles with good results. The tuft bind, a measure of the amount of force used to pull the turf yarn from the primary backing, was around 7.5 pounds as tested on a Twing Albert Tensile Tester according to ASTM standard D 1335-05.

EXAMPLE 7

The pellets from Example 3 were placed into a sample of synthetic turf. The turf sample was placed on a LisPort tester and tested for about 40 hours. The G-max at the start of the test was 125, and the G-max at the end of the test was 150. Both G-max values are considered good.

EXAMPLE 8

The pellets from Example 3 were placed on a the Roll Stool. The results were good after 10,000 cycles; however, some wear was observed on the pellets.

EXAMPLE 9

The pellets from Example 2 were extruded onto the back of a synthetic turf as a backing. The sample was placed on the roll stool and tested. The sample was tested to 10,000 cycles with good results. Little to no wear or deterioration of the sample was observed.

All patents, publications and abstracts cited above are incorporated herein by reference in their entirety. It should be understood that the foregoing relates only to preferred embodiments of the present invention and that numerous modifications or alterations may be made therein without departing from the spirit and the scope of the present invention as defined in the following claims.

That which is claimed is:

1. A method of recycling synthetic turf comprising: providing synthetic turf fragments comprising a backing and face fibers and including infill contained therein, wherein the turf fragments further comprise a thermoset polyurethane; removing from at least 80% to 98% of the infill from the synthetic turf fragments; agglomerating the synthetic turf fragments to form granules; placing the granules in an extruder; and, extruding the granules to form an extrudate.

2. The method of claim 1 wherein at least 80% to from at least 95% of the infill is removed.

3. The method of claim 1, further comprising adding a filler, a modifier, or a colorant, or a combination thereof to the granules before or during the step of extruding.

4. The method of claim 3, wherein the granules, the filler and the modifier are combined together to form a combination such that granules are present in an amount of about 10 wt % to about 90 wt % of the combination, the filler is absent or present in an amount of about 0 wt % to about 50 wt % of the combination, and the modifier is present in an amount of about 10 wt % to about 90 wt % of the combination.

5. The method of claim 3, wherein the filler is calcium carbonate, barium sulfate, coal fly ash, or iron oxide or a combination thereof.

6. The method of claim 3, wherein the modifier is polypropylene, polyethylene, rubber, ExxonMobil Vistamaxx 3000 Propylene-based elastomer, Exxon PX 9361, ExxonMobil Exact 9371 ethylene-based plastomer resin, or Faraprene 381-35A, or a combination thereof.

7. The method of claim 1, further comprising cutting the extrudate into pellets.

8. The method of claim 1, wherein the step of agglomerating the synthetic turf fragments comprises mechanically melting the synthetic turf fragments and reducing the size of the synthetic turf fragments.

9. The method of claim 1, wherein the step of extruding the granules comprises heating and mixing the granules.

10. The method of claim 3, wherein the step of extruding the granules comprises heating and mixing the granules with the filler, the modifier, or the colorant or the combination thereof 11. The method of claim 1, wherein the synthetic turf comprises: face fibers; the backing; and, a primary coating.

12. The method of claim 11, wherein the face fibers comprise polyethylene, polypropylene or nylon or a combination thereof.

13. The method of claim 11, wherein the backing comprises polyester or polypropylene or a combination thereof 14. The method of claim 11, wherein the primary coating comprises polyurethane, latex, hot melt, or a thermoplastic or a combination thereof.

15. The method of claim 12, wherein the polyethylene, polypropylene or nylon or the combination thereof comprise about 19 wt % to about 80 wt % of the synthetic turf fragments.

16. The method of claim 13, wherein the polyester or polypropylene or the combination thereof comprise about 1 wt % to about 25 wt % of the synthetic turf fragments.

17. The method of claim 14, wherein the polyurethane, latex, hot melt, or the thermoplastic, or the combination thereof comprise about 15 wt % to about 80 wt % of the synthetic turf fragments.

18. The method of claim 1 wherein the granules placed in the extruder range in average size from about 1 millimeter to about 6 millimeters.

\* \* \* \* \*